(12) United States Patent
Knijnenburg et al.

(10) Patent No.: US 10,322,812 B2
(45) Date of Patent: Jun. 18, 2019

(54) DEVICE FOR PROVIDING A SIGNAL INDICATING WHETHER A DEPLOYED EVACUATION SLIDE OF AN AIRCRAFT IS READY FOR USE

(71) Applicant: Airbus Operations GmbH, Hamburg (DE)

(72) Inventors: Thorsten Knijnenburg, Hamburg (DE); Andreas Harzmeier, Hamburg (DE); Ilja Waigl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 400 days.

(21) Appl. No.: 15/341,683

(22) Filed: Nov. 2, 2016

(65) Prior Publication Data
US 2017/0144770 A1    May 25, 2017

(30) Foreign Application Priority Data
Nov. 3, 2015    (EP) .................................... 15192852

(51) Int. Cl.
*B64D 25/14*    (2006.01)
*B64C 1/14*    (2006.01)
*B64D 45/00*    (2006.01)

(52) U.S. Cl.
CPC ............ *B64D 25/14* (2013.01); *B64C 1/1461* (2013.01); *B64D 45/00* (2013.01)

(58) Field of Classification Search
CPC ........ B64C 1/1461; B64D 25/14; B64D 45/00
See application file for complete search history.

(56) References Cited

U.S. PATENT DOCUMENTS 6,321,770 B1 * 11/2001 Hintzman ............... B64D 25/14
137/494
6,814,183 B2 * 11/2004 Horvath ................. B64D 25/14
182/48

(Continued)

FOREIGN PATENT DOCUMENTS

EP    1410987 A2    4/2004

OTHER PUBLICATIONS

Extended European Search Report for Application No. 15192852 dated Feb. 3, 2016.

*Primary Examiner* — Justin M Benedik
(74) *Attorney, Agent, or Firm* — Jenkins, Wilson & Taylor & Hunt, P.A.

(57) ABSTRACT

A device providing a signal indicating whether a deployed aircraft evacuation slide is ready for use. A tilt sensor measures tilt angle about a predetermined axis and a tilt sensor measurement signal is provided. An inertial sensor detects acceleration and provides an inertial sensor measurement signal. A slide signal input terminal receives a slide signal indicating deployment of an evacuation slide and of a deployment length. A tilt angle signal output terminal at which a tilt angle signal is provided, and a slide status output terminal and a control unit to determine, based on the detected acceleration, a moment when the device is at rest with respect to earth and to set orientation of the reference plane to a predetermined orientation. The control unit stores data depending on position of a door, and can determine a slide length. A slide status signal is provided at the slide status output terminal.

13 Claims, 3 Drawing Sheets

(56) References Cited

U.S. PATENT DOCUMENTS

| | | | |
|---|---|---|---|
| 8,215,586 B2* | 7/2012 | O'Donnell | B64D 25/14 182/48 |
| 2003/0080254 A1* | 5/2003 | Alberts | B64D 25/14 244/137.2 |
| 2004/0094671 A1* | 5/2004 | Moro | B64D 25/14 244/137.2 |
| 2017/0088274 A1* | 3/2017 | Hartman | B64D 25/14 |
| 2018/0339779 A1* | 11/2018 | Bahena | B64D 25/14 |

* cited by examiner

DEVICE FOR PROVIDING A SIGNAL INDICATING WHETHER A DEPLOYED EVACUATION SLIDE OF AN AIRCRAFT IS READY FOR USE

CROSS-REFERENCE TO RELATED APPLICATION

This application claims priority to European Patent Application No. 15192852.0 filed Nov. 3, 2015, the entire disclosure of which is incorporated herein by reference.

TECHNICAL FIELD

The present application relates to a device for providing a signal indicating whether a deployed evacuation slide of an aircraft is ready for use, as well as to a door arrangement and an aircraft comprising such a device.

BACKGROUND

Aircraft doors of many passenger aircraft are provided with an evacuation slide which can be selectively deployed in the case of an emergency landing in order to allow passengers to quickly leave the aircraft through the respective door. The deployment of such slides is controlled by slide actuation means, which are part of or controlled by a local door controller, which is associated with the door and adapted to control various functions thereof. Typically, the slides have an activated state and a deactivated state between which they can be switched by a slide release lever. In the activated state the slides are automatically deployed upon opening of the respective door, whereas in the deactivated state the door can be opened without causing deployment of the slide.

Such an evacuation slide is normally in a retracted state, in which the slide is integrated into the door. When deployed the slide projects from the door and extends in an oblique manner from the door opening towards the ground. In order to enable passengers to safely reach the ground when using the slide the deployed slide must be long enough to reach the ground.

In this regard it must be taken into consideration that after an emergency landing the aircraft may be damaged and may therefore possibly not be in its normal landing position, in which the longitudinal axis of the aircraft is extending horizontally, i.e., parallel to the ground. Such non-horizontal orientation of the aircraft may also occur if some of the wheels of the aircraft come to rest on an unevenness. Thus, at the time at which an evacuation slide of the aircraft is to be used, the aircraft may be in a position in which the longitudinal axis of the aircraft is inclined with respect to the ground for the above reasons. This has the consequence that the actual distance between an aircraft door, at which an evacuation slide is to be deployed, and the ground may be larger than in the case of the normal horizontal orientation of the aircraft. For example, the aircraft may be, in particular, in a nose-up position, in which the nose of the aircraft is pointing upwardly in an oblique manner, because the nose wheel is in the air spaced from the ground. In such a nose-up position the distance between the front aircraft doors, which are typically provided with evacuation slides, and the ground is larger than for the normal horizontal orientation, in which all wheels are in contact with the ground. In these cases an evacuation slide, which is configured for the case of the normal horizontal orientation of the aircraft, either does not reach the ground at all or extends at an angle which is too steep to allow for a safe use of the slide.

For this reason it is known to construct evacuation slides such that they can be selectively deployed with two different lengths, a normal length corresponding to a horizontal orientation of the aircraft and an increased length corresponding to an orientation of the aircraft in which the pitch angle with respect to the horizontal direction exceeds a defined limit value. For example, the slide may comprise a main portion and an extension portion, wherein the main portion can be deployed either alone or together with the extension portion. Such an evacuation slide is able to address, in particular, the above-mentioned nose-up situations. In order to enable the determination of the pitch angle required for this purpose, the aircraft comprises a plurality of pitch angle sensors, which are installed at a central location in the aircraft and are connected by cables to the door controllers or a slide release means of individual doors.

In this manner, the door controllers or slide release mechanisms connected to the pitch angle sensors are able to take into consideration the current pitch angle when deploying the slide and to control the deployment length of the slide accordingly.

In order to be able to account for situations in which an evacuation slide fails to deploy either partially or completely the associated door controller may be configured to receive a signal from the slide which is indicative of deployment of the slide and of the actual deployment length of the slide, e.g., of the number of deployed stages of a multi-stage slide. Such signal may be generated by suitable sensors provided on the slide. Based on the signal the door controller is able to detect a failure of the slide and to control a signaling device associated with the door to provide an indication that the slide is not ready for use. For example, the signaling means may be an optical signaling means or an acoustic signaling means, so that the indication may be optical or acoustical.

For the purpose of providing this indication and also in order to also account for situations in which the pitch angle of the aircraft changes after deployment of the evacuation slide at the beginning of an evacuation, the door controller is typically configured to monitor and analyze for a predetermined minimum time period of, e.g., 120 seconds after initiating deployment of the slide the signal from the slide and the pitch angle and to determine whether the actual deployment length of the slide is large enough for the particular door and for the current pitch angle of the aircraft. When it is determined that the deployment length is not large enough, the indicating means is controlled to indicate that the slide is not ready for use.

This arrangement is not very flexible and requires high installation and maintenance effort. For example, it requires high effort to manually calibrate the pitch angle sensors. Further, all door controllers need to implement the functionality for monitoring and analyzing the pitch angle and the deployment length of an evacuation slide after deployment thereof, even though this functionality is typically only required at the two doors nearest to the nose, because specifically for these doors nose-up situations pose a problem. This functionality unnecessarily adds to the costs and weight of the door controllers.

SUMMARY

It is an object of the present disclosure to provide a simple and flexible solution by which an indication whether a deployed evacuation slide of an aircraft is ready for use can be reliably provided, as well as to provide a door arrangement and an aircraft implementing this solution.

According to the present disclosure a device is provided for providing a signal indicating whether a deployed evacuation slide of an aircraft is ready for use. This signal encodes in a defined format the information as to whether or not the slide is ready for use and can therefore be used by an external device, such as a display or indicating device or a processing device, to indicate the operationality, operability or usability of a deployed slide or to control such a display or indicating device appropriately. The external device may be, e.g., a door and slides indicator panel or a local door controller typically found in aircraft doors.

The device according to the present disclosure comprises a tilt or inclination sensor which is adapted to measure a tilt angle of the entire device about a predetermined axis with respect to a reference plane. Thus, the predetermined axis is fixedly defined with respect to the device and extends in the reference plane. The tilt sensor is adapted to provide a tilt sensor measurement signal which is characteristic or indicative of the measured tilt or inclination angle. When mounted in an aircraft such that the predetermined axis extends parallel to the pitch axis of the aircraft, the tilt sensor measures the pitch angle.

The device further comprises one or more inertial sensors. These inertial sensors may be part of or provided as an inertial measurement unit and may take the form of accelerometers or gyro sensors. Each such inertial sensor is adapted to detect, continuously or intermittently, an acceleration of the entire device and to provide a corresponding inertial sensor measurement signal which is characteristic or indicative of the respective detected acceleration. As described further herein, the one or more detected accelerations are chosen such that a standstill of the device with respect to earth can be inferred from them.

Moreover, the device comprises a slide signal input terminal for receiving a slide signal having a predetermined signal format. The terminal may be, e.g., a plug or socket for connection to a cable or wire via which the slide signal provided by an external means. The predetermined signal format is defined such that the slide signal is characteristic or indicative of deployment of an evacuation slide of an aircraft and of a length of the slide after deployment thereof, such as, e.g., a number of deployed stages or portions of a multi-stage or multi-portion evacuation slide. In other words, the device expects a slide signal having a defined format and an information content relating to a particular external evacuation slide and the deployment state thereof. The device is therefore able to determine deployment and the actual deployment length of the slide by analyzing the received slide signal.

Further, the device comprises a tilt angle signal output terminal at which a tilt angle signal representative or indicative of the tilt sensor measurement signal is provided. The terminal may be, e.g., a plug or socket for connection to a cable or wire via which the tilt angle signal can be provided to an external structure, such as a local door controller of an aircraft door. In this manner, the device can be used instead of the presently used pitch angle sensors for providing the door controller with the information about the pitch angle of the aircraft necessary for the door controller to be able to control deployment of an evacuation slide. As already explained above, for this purpose the device is mounted in an aircraft such that the predetermined axis extends parallel to the pitch axis of the aircraft.

The device also comprises a slide status output terminal. Again this terminal may be, e.g., a plug or socket for connection to a cable or wire via which a signal may be provided to an external structure or mechanism.

Furthermore, the device comprises a control or processing unit which is connected to the tilt sensor for receiving the tilt sensor measurement signal, to the one or more inertial sensors for receiving the inertial sensor measurement signal or signals, to the slide signal input terminal for receiving a slide signal present at the slide signal input terminal, and to the slide status output terminal.

The control unit is adapted to determine, based on the detected one or more accelerations, which are derived from the inertial sensor measurement signal or signals by the control unit, a moment in time when the device is at rest with respect to the earth, i.e., at a standstill. Upon detecting such moment in time the control unit sets the orientation of the reference plane to a predetermined orientation with respect to the device. This setting of the reference plane provides for a self-calibration of the one or more inertial sensors by the device. When mounted in an aircraft such that the predetermined orientation corresponds to the horizontal plane in the normal horizontal orientation of the aircraft in the landed condition, the self-calibration sets the reference plane to the horizontal plane. In order to avoid that the reference plane is set incorrectly by this function after an emergency landing with an orientation of the aircraft deviating from the normal horizontal orientation, the control unit is configured such that the detected moment of time is a predetermined time interval after the standstill is first detected, such as, e.g., 30 minutes.

The control unit stores, in the control unit or in a separate memory which is part of the device and accessible by the control unit, aircraft specific data associated with a defined type of aircraft and depending on the position of a door of the aircraft with respect to ground when the aircraft rests on a flat surface in the normal or horizontal or level position, in which all wheels of the aircraft are in contact with the surface.

The control unit is also adapted to determine—at least for a predetermined minimum time period of, e.g., 120 seconds—following an indication of deployment of an evacuation slide derived by the control unit from the received slide signal and on the basis of a tilt angle derived by the control unit from the received tilt sensor measurement signal, a slide length derived by the control unit from the received slide signal and the aircraft specific data, if the slide length is large enough for the evacuation slide to be ready for use at the tilt angle. The control unit continuously or intermittently analyzes the slide signal to detect deployment, and it is further adapted to generate based on the result of the determination a slide status signal, which is provided at the slide status output terminal. Thus, it can be determined by analyzing the slide status signal whether or not the slide is ready for use, so that an external display or indicator, such as a door and slides indicator panel, is able to indicate in case an associated slide is not ready for use.

It has been recognized by the present inventors specifically by integrating measurement of a tilt angle and of at least one acceleration as well as an evaluation of these measurement values into a single device significant advantages can be achieved. The device requires a very low installation effort, because no installation, set-up and maintenance of central pitch angle sensors is required and, instead, it is merely necessary to individually and selectively install the device at each aircraft door provided with an evacuation slide and necessitating the functionality of indicating whether the slide is ready for use when taking into consideration the deployment length and the orientation of the aircraft. It is even possible to deliver the respective doors or door arrangements as finished component without requiring additional installation effort at the final assembly line. Further, a modular approach is provided which makes it possible in a flexible and very simple manner to selectively provide the above functionality in each door. It is thereby also possible to achieve a weight reduction, because it is no longer required to prepare each and every door for this functionality, e.g., by including a corresponding emergency power supply. Finally, as tilt sensors are subject to an inherent drift necessitating periodic calibration, the automatic self-calibration provided by the present device is another significant advantage.

In a preferred embodiment the device is constructed as a single unit which is constructed such that installable into or on a door blade or door frame of a door arrangement of an aircraft, e.g., by integration into a door lining. The single unit, or the device of the present disclosure in general, preferably comprises a common housing, in and/or on which all components of the device are disposed.

In a preferred embodiment the aircraft specific data comprise parameters including slide parameters, which describe one or more possible deployment lengths or a range of possible deployment lengths of the slide of the aircraft associated with the door and a range of angles at which the slide may extend with respect to the aircraft while being safe for use by the passengers, as well as a height value indicative of the height or distance of the door of the aircraft above the ground when the aircraft rests on the ground in its normal, horizontal orientation. Alternatively or additionally, the aircraft specific data include limit values for the tilt angle for different slide lengths. In the case of limit values, which advantageously provide a particularly simple approach, a slide length is considered not to be large enough for the evacuation slide to be ready for use if the tilt angle derived from the tilt angle measurement signal is larger than the limit value for the slide length derived from the slide signal. By contrast, in the case of parameters including slide parameters and a height value the control unit is adapted to calculate or otherwise determine on the basis of these parameters the necessary minimum length for the measured tilt angle and compares the necessary minimum length with the slide length indicated by the slide signal.

In a preferred embodiment at least one of the one or more detected accelerations is chosen such that it is different when the device is moving with respect to the earth as compared with the case in which the device is not moving with respect to the earth. This allows for a particularly simple determination of standstill of the device.

Alternatively or additionally the control unit may be adapted to monitor the detected one or more accelerations over time and to analyze the time dependence of them in order to determine a moment in time when the device is at rest with respect to the earth. For example, the control unit may determine at first an acceleration characteristic of touchdown during landing and then a deceleration until standstill.

In any case, the detected one or more accelerations include a linear acceleration in a direction perpendicular to the predetermined axis. When the device is mounted inside an aircraft in the above-described manner such that the predetermined axis extends parallel to the pitch axis of the aircraft the pitch axis of the aircraft, the direction along which the linear acceleration is measured can be oriented along the longitudinal direction of the aircraft, thereby allowing for a particularly simple detection of standstill.

In a preferred embodiment the at least one inertial sensor is an accelerometer or a gyrometer.

In a preferred embodiment the device further comprises an energy supply terminal for receiving energy from an external power source for powering the device. Such energy supply terminal may include two sub-terminals, one for connection to a general power supply net of an aircraft and one for connection to an external emergency power source.

In a preferred embodiment the device further comprises an own independent power source, such as a—preferably rechargeable—battery or a capacitor, adapted to power the device following an indication of deployment of an evacuation slide derived from the received slide signal and/or following loss of external power, in particular loss of power on the energy supply terminal mentioned above. By providing such an independent energy source in the device, no emergency power for the functionality of the device must be provided in a door controller. The above-described functionality of providing an indication as to whether a deployed slide is ready for use typically implemented by a door controller accounts for a significant portion of the necessary amount of emergency power stored in the door controller. Thus, due to the use of the device the emergency power requirements of the door controller are significantly reduced, allowing for smaller emergency power energy storage devices and, thus, for a significant weight reduction of the door controller. Since it is desirable to use the same door controller at all doors, regardless of whether they are provided with a slide or require the above functionality, a significant weight reduction of the entire aircraft is achieved.

In a preferred embodiment the tilt sensor is a microelectromechanical system (MEMS).

In a preferred embodiment the device further comprises an optical and/or acoustic indicator adapted to emit an optical signal and an acoustic signal, respectively, depending on the slide status signal.

The present disclosure further provides a door arrangement for an aircraft comprising a door frame defining an opening and adapted to be mounted in an aperture in a fuselage of an aircraft and a door blade mounted in the door frame in such a manner that it is movable between a closed position, in which it closes the opening, and an open position, in which the opening is accessible. The door arrangement further comprises an evacuation slide having a retracted position from which it is selectively deployable into at least a first deployed state having a first length and a second deployed state having a second length different from the first length. The slide may be mounted to the door frame, to the door blade, or adapted to be mounted to a portion of the fuselage of an aircraft adjacent the door frame.

The door arrangement also comprises an indicator and a door controller coupled to the slide and adapted to control deployment of the slide. The door controller, or alternatively the slide, is adapted to generate the above-mentioned slide signal. The slide signal may be based on the control provided by the door controller, or may preferably be based on a signal received from or provided by or at the slide and provided by suitable sensors or detectors, as already mentioned above.

Moreover, the door arrangement comprises a device according to any of the above-described embodiments mounted to the door frame or to the door blade. The slide signal input terminal is connected to the door controller or to the slide to receive the slide signal generated by the door controller and the slide, respectively, the tilt angle signal output terminal is connected to the door controller to provide the tilt angle signal to the door controller, and the slide status output terminal is connected to the indicator, wherein the indicator is adapted to indicate, based on the slide status signal received from the slide status output terminal, when slide is not ready for use following deployment thereof.

The door arrangement and in particular the door blade preferably comprises a defined horizontal and longitudinal direction which, after mounting the door arrangement in a fuselage of an aircraft extends in the longitudinal direction of the aircraft. The predetermined axis is then preferably oriented parallel to the pitch axis of the aircraft.

The disclosure herein also provides an aircraft comprising a fuselage, in which an aperture is formed, and a door arrangement having the above-described construction, wherein the door frame of the door arrangement is mounted in the aperture. The predetermined axis is oriented perpendicularly with respect to a longitudinal direction of the fuselage, and the aircraft specific data are specific to the aircraft and the door provided by the door arrangement.

BRIEF DESCRIPTION OF THE DRAWINGS

In the following an exemplary embodiment of the disclosure herein is described in detail with reference to the drawings.

DETAILED DESCRIPTION

Figure 2:
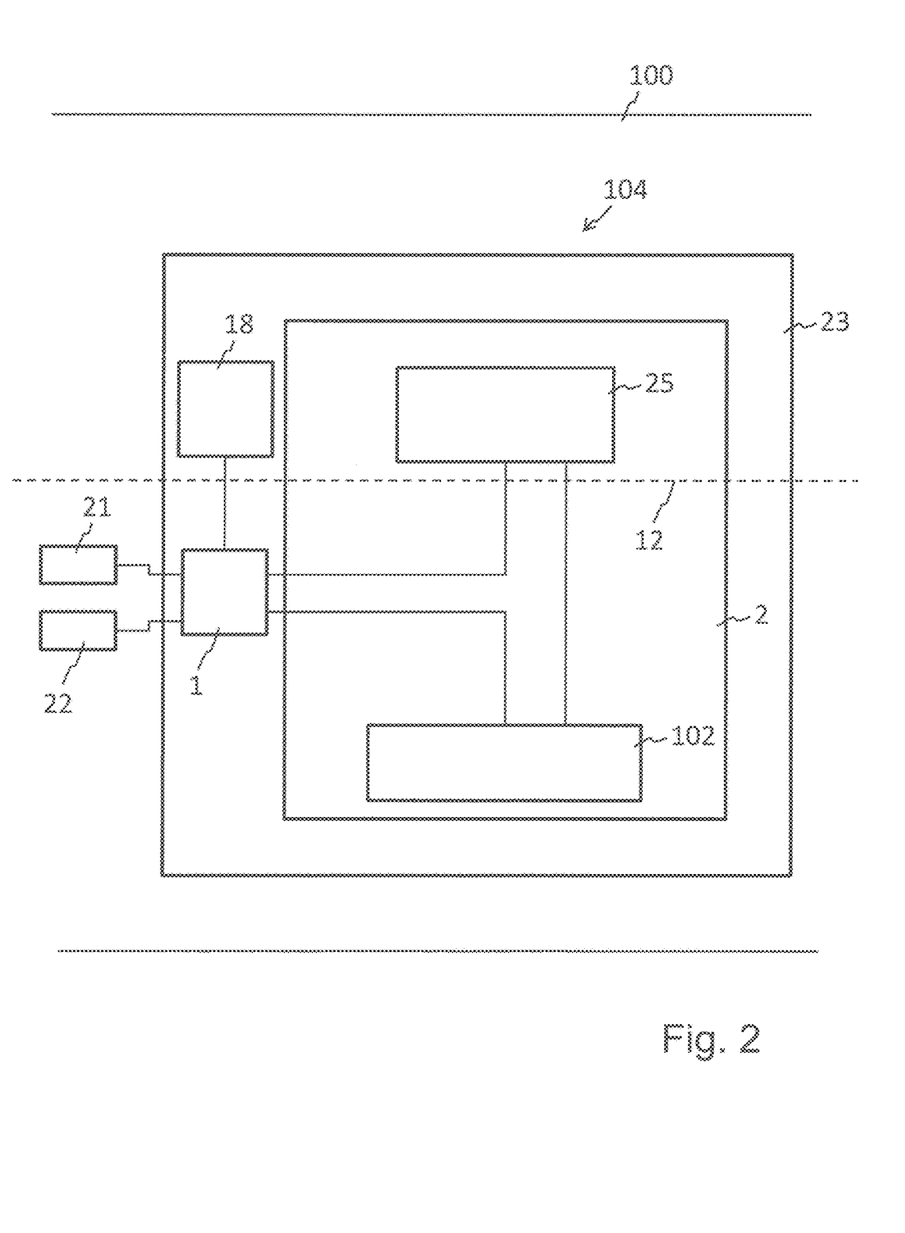
FIG. 2 schematically illustrates an aircraft door arrangement including the device of FIG. 1.
Figure 3A:
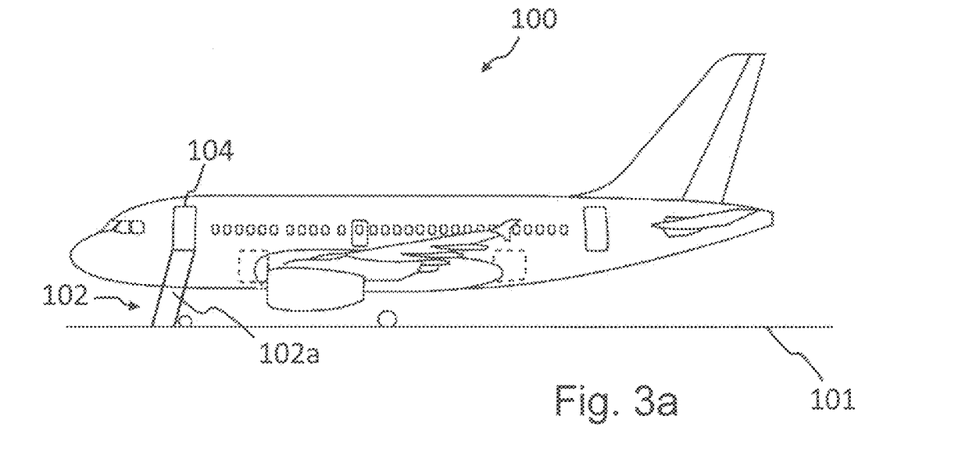
FIG. 3a shows an aircraft comprising the door arrangement of FIG. 2 in a normal horizontal orientation on the ground.
Figure 3B:
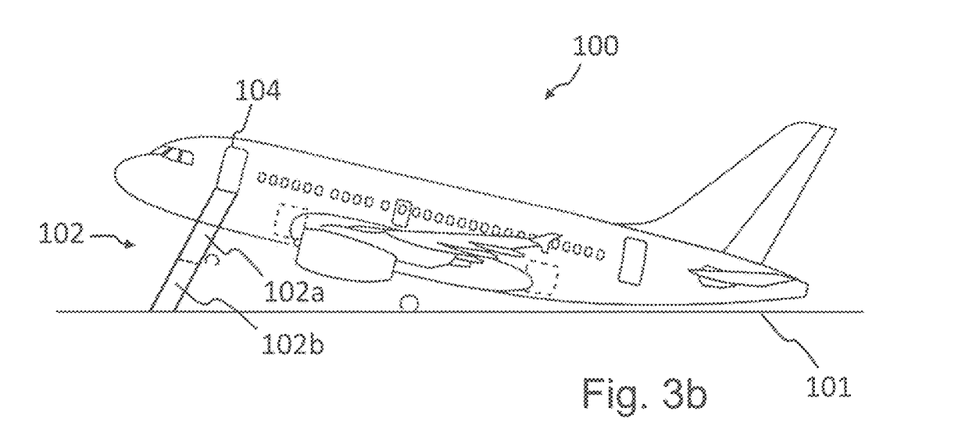
FIG. 3b shows the aircraft of FIG. 3a in a nose-up orientation.

In FIGS. 3a and 3b a landed aircraft 100 is depicted having a door arrangement 104 including an evacuation slide 102. The evacuation slide 102 is shown after deployment thereof, and it can be seen that the slide 102 comprises two deployment portions 102a and 102b. The slide 102 can be controlled to deploy only portion 102a, as seen in FIG. 3a, or both portions 102a and 102b, as seen in FIG. 3b, in order to selectively obtain two different deployment lengths. This control of the slide 102 is effected by a door controller of the door arrangement 104 described below with reference to FIG. 2.

In FIG. 3a the aircraft 100 is in its normal horizontal orientation, in which the longitudinal axis of the aircraft extends horizontally, and in FIG. 3b the aircraft 100 is in a nose-up orientation, in which the nose is pointing slightly upwardly. It can be seen from FIGS. 3a and 3b that the distance between the door arrangement 104 and the ground 101 is smaller in the case of FIG. 3a as compared to the case of FIG. 3b. Therefore, in order to allow use of the slide 102 by passengers to reach the ground 101, in FIG. 3a only the first portion 102a is deployed, whereas in FIG. 3b both the first portion 102a and second portion 102b are deployed.

It is also apparent from FIGS. 3a and 3b that in case of a partial or complete failure of deployment of the slide 102 in the above manner, the slide 102 may not be ready for use by the passengers. In an emergency situation this must be clearly and reliably communicated to the aircraft personnel and the passengers, so that injuries due to the use of the slide are avoided and another slide at another door may be used instead.

For this purpose, the door arrangement 104 comprises a device 1 (see FIGS. 1 and 2) adapted for providing a signal indicating whether a deployed evacuation slide of an aircraft is ready for use.

The device 1 is a single unit comprising a housing 3. Inside the housing 3 a tilt or inclination sensor 4, an accelerometer 5, a control unit 6, and a battery 7, which is preferably rechargeable and/or replaceable, are disposed (elements not belonging to the device 1 are shown with dotted lines in FIG. 1).

Figure 1:
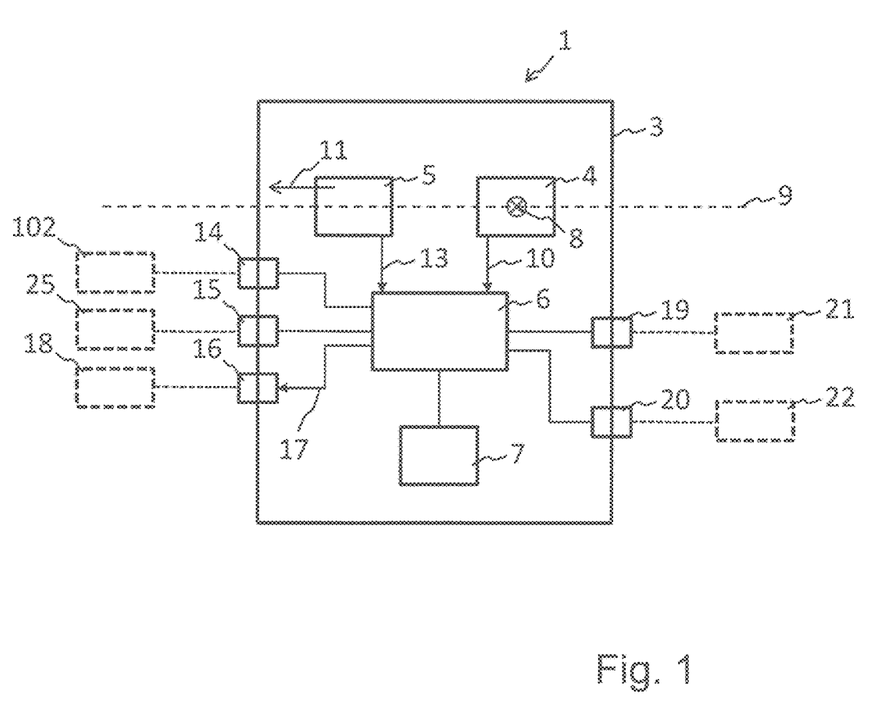
FIG. 1 shows a block diagram of an embodiment of a device according to the present disclosure.

The tilt sensor 4 is adapted to measure a tilt angle of the entire device 1 about a predetermined axis 8 and with respect to a reference plane 9. The tilt sensor 4 is adapted to provide a tilt sensor measurement signal 10 which is characteristic or indicative of the measured tilt angle. When mounted in an aircraft 100 such that the predetermined axis 8 extends parallel to the pitch axis of the aircraft 100, as illustrated in FIG. 2, the tilt sensor 4 measures the pitch angle of the aircraft 100.

The accelerometer 5 is adapted to detect, continuously or intermittently, a linear acceleration of the entire device 1 along a defined direction 11, perpendicular to the axis 8. The accelerometer 5 is adapted to provide a corresponding measurement signal 13 which is characteristic or indicative of the detected acceleration. When mounted in an aircraft 100 such that the defined direction 11 extends parallel to the longitudinal axis 12 of the aircraft 100, as illustrated in FIG. 2, the detected acceleration indicates a standstill of the aircraft 100 when the acceleration has a zero value.

Both the tilt sensor 4 and the accelerometer 5 are connected to the control unit 6, such that the control unit 6 receives the tilt sensor measurement signal 10 and the measurement signal 13 provided by the accelerometer 5.

The device 1 also comprises a slide signal input terminal 14 for receiving a slide signal having a predetermined signal format, a tilt angle signal output terminal 15, and a slide status output terminal 16. Each of these terminals may be a plug or socket for connection to a corresponding cable or wire, and each of them is connected to the control unit 6.

The predetermined signal format expected by the device 1 for the slide signal is defined such that the slide signal is characteristic or indicative of deployment of an evacuation slide 102 of an aircraft 100 and of a length of the slide 102 after deployment thereof, such as, e.g., the number of deployed stages or portions 102a, 102b of the two-stage evacuation slide 102 of the aircraft 100.

At the tilt angle signal output terminal 15 the tilt sensor measurement signal 10 is provided by the control unit 6 as a tilt angle signal.

The control unit 6 is adapted to determine, based on the detected acceleration, which is derived by the control unit 6 from the measurement signal 13, a moment in time when the device 1 is at rest with respect to the earth, i.e., at a standstill. When mounted in the aircraft 100 in the above-described manner a standstill of the entire aircraft 100 is determined thereby. Upon detecting such moment in time the control unit sets the orientation of the reference plane 9 to a predetermined orientation with respect to the device 1, which orientation is preferably the horizontal orientation of the aircraft 100 when the device 1 is mounted therein in the manner illustrated in FIG. 2 and described in more detail below. Thus, an automatic self-calibration of the accelerometer 5 is provided for, as already explained in detail above.

The control unit 6 stores aircraft specific data associated with the aircraft 100 and depending on the position of the door arrangement 104 of the aircraft 100 with respect to ground 101 when the aircraft 100 rests on a flat surface 101 in the normal or horizontal or level position illustrated in FIG. 3a, i.e. with all wheels of the aircraft 100 in contact with the surface 101.

The control unit 6 is also adapted to determine for a predetermined minimum time period of, e.g., 120 seconds following an indication of deployment of an evacuation slide derived by the control unit 6 from a slide signal received on the slide signal input terminal 14 and on the basis of a tilt angle derived by the control unit 6 from the received tilt sensor measurement signal 10, a slide length derived by the control unit 6 from the received slide signal and the aircraft specific data, if the slide length is large enough for the evacuation slide 102 to be ready for use at the tilt angle. The control unit 6 continuously or intermittently analyzes the slide signal to detect deployment, and it is further adapted to generate based on the result of the determination a slide status signal 17, which is provided at the slide status output terminal 16. Thus, it can be determined by analyzing the slide status signal 17 whether or not the slide 102 is ready for use, so that an external display or indicator 18 (see FIG. 2) is able to provide an indication in case the slide 102 is not ready for use.

The battery 7 is connected to the control unit 6 to provide emergency power to the control unit 6 and the remaining components of the device 6 in case of loss of external power. For receiving external power the device 1 comprises a power supply terminal 19, 20, including a first terminal 19 and a second terminal 20, both of which are connected to the control unit 6 to provide power to the control unit 6 and the remaining components of the device 6. The first terminal 19 may be connected to a normal power supply net 21 of an aircraft 100, and the second terminal 20 may be connected to an external emergency energy power source 22, such as an external battery, e.g., an emergency power supply unit.

The device 1 is part of the aircraft 100 and door arrangement 104 schematically illustrated in FIGS. 2, 3a and 3b. The door arrangement 104 comprises a door frame 23 mounted in an aperture 24 in the fuselage of the aircraft 100, such that the door blade 2 is moveable between a closed position (shown in FIG. 2) and an open position. The device 1 is fixedly mounted to the door frame 23 in a defined orientation with respect to the door arrangement 104 and the aircraft 100. Specifically, the predetermined axis 8 is extending parallel to the pitch axis of the aircraft 100, and the defined direction 11 is extending parallel to the longitudinal axis 12 of the aircraft 100.

The door arrangement 104 comprises a door controller 25, which is connected to the slide 102 for controlling deployment thereof and to the tilt angle signal output terminal 15 of the control unit 6. Thus, the device 1 provides the door controller 25 with the tilt angle required for controlling the deployment length of the slide 102, so that separate central pitch angle sensors are advantageously not necessary for this purpose.

The door controller 25 or the slide 102 is connected to the slide signal input terminal 14 to provide the above-described slide signal, and the display or indicating means 18, which is likewise part of the door arrangement 104, is connected to the slide status output terminal 16 to receive the above-described slide status signal 17 allowing the display or indicator 18 to provide an indication in case the slide 102 is not ready for use.

In case the door controller 25 is connected to the slide signal input terminal 14, the slide signal provided by the door controller 25 at the slide signal input terminal 14 may, e.g., merely represent the control commands sent by the door controller 25 to the slide 102. Then, the slide signal includes no feedback from the slide 102 as to whether the slide 102 was correctly deployed in accordance with the control effected by the door controller 25. Consequently, the deployment length derived from the slide signal by the control unit 6 is then the desired or commanded deployment length of the slide, which may deviate from the actual deployment length in case of a partial or complete failure of the slide 102. In principle, the same may also be the case if the slide 102 is connected to the slide signal input terminal 14 and if the slide 102 generates the slide signal only based on the control commands received from the door controller 25.

In case the slide 102 is configured to provide feedback indicative of deployment of the slide and of the actual deployment length of the slide as noted above, e.g., by having suitable sensors or detectors, the door controller 25 preferably receives such feedback and is adapted to generate the slide signal based on the feedback to include the actual deployed slide length. On the other hand, it is also possible that the slide 102 is connected to the slide signal input terminal 14 and the feedback is provided in the form of the slide signal directly by the slide 102 to the slide signal input terminal 14.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for providing a signal indicating whether a deployed evacuation slide of an aircraft is ready for use, the device comprising:

a tilt sensor adapted to measure a tilt angle of the device about a predetermined axis with respect to a reference plane, and to provide a tilt sensor measurement signal characteristic of the measured tilt angle;

at least one inertial sensor adapted to detect an acceleration of the device and to provide an inertial sensor measurement signal characteristic of the detected acceleration;

a slide signal input terminal for receiving a slide signal having a predetermined format, which is defined such that the slide signal is indicative of deployment of an evacuation slide of an aircraft and of a length of the slide after deployment thereof;

a tilt angle signal output terminal at which a tilt angle signal representative of the tilt sensor measurement signal is provided;

a slide status output terminal; and a control unit connected to the tilt sensor, to the at least one inertial sensor, to the slide signal input terminal, and to the slide status output terminal, wherein the control unit is adapted to determine, based on the detected at least on acceleration derived from the inertial sensor measurement signal, a moment in time when the device is at rest with respect to earth and to then set the orientation of the reference plane to a predetermined orientation with respect to the device, wherein the control unit stores aircraft specific data associated with a defined type of aircraft and depending on the position of a door provided by a door arrangement of the aircraft with respect to ground when the aircraft rests on a flat surface, and wherein the control unit is adapted to determine, at least for a predetermined minimum time period following an indication of deployment of an evacuation slide derived from the received slide signal and on the basis of a tilt angle derived from the received tilt sensor measurement signal, a slide length derived from the received slide signal and the aircraft specific data, if the slide length is large enough for the evacuation slide to be ready for use at the tilt angle, and to generate based on the result of the determination a slide status signal, which is provided at the slide status output terminal.

2. The device according to claim 1, which is constructed as a single unit which is installable into or on a door blade or door frame of a door arrangement of an aircraft.

3. The device according to claim 1, wherein the aircraft specific data comprise:

parameters including slide parameters, which describe one or more possible slide lengths, a range of angles at which the slide can extend with respect to the aircraft while being considered safe for use by the passengers as well as a height value indicative of height of the door of the aircraft above the ground when the aircraft rests on the ground; or limit values for the tilt angle for different slide lengths, wherein a slide length is considered not to be large enough for the evacuation slide to be ready for use if the tilt angle derived from the tilt angle measurement signal is larger than the limit value for the slide length derived from the slide signal.

4. The device according to claim 1, wherein the detected at least one acceleration when the device is moving with respect to the earth is different from the at least one acceleration when the device is not moving with respect to the earth.

5. The device according to claim 1, wherein the control unit is adapted to monitor the detected at least one acceleration over time and to analyze the time dependence of the at least one acceleration in order to determine a moment in time when the device is at rest with respect to the earth.

6. The device according to claim 1, wherein the detected at least one acceleration includes a linear acceleration in a direction perpendicular to the predetermined axis.

7. The device according to claim 1, wherein the at least one inertial sensor is an accelerometer or a gyrometer.

8. The device according to claim 1, further comprising an energy supply terminal for receiving energy from an external power source for powering the device.

9. The device according to claim 1, further comprising a battery adapted to power the device following an indication of deployment of an evacuation slide derived from the received slide signal or following loss of external power.

10. The device according to claim 1, wherein the tilt sensor is a micro-electromechanical system.

11. The device according to claim 1, further comprising an optical or acoustic indicator adapted to emit an optical signal and an acoustic signal, respectively, depending on the slide status signal.

12. A door arrangement for an aircraft, comprising:

a door frame defining an opening and adapted to be mounted in an aperture in a fuselage of an aircraft;

a door blade mounted in the door frame such that the door blade is movable between a closed position, in which it closes the opening, and an open position, in which the opening is accessible;

an evacuation slide having a retracted position from which the evacuation slide is selectively deployable into at least a first deployed state having a first length and a second deployed state having a second length different from the first length;

a door controller coupled to the slide and adapted to control deployment of the slide, wherein the door controller or the slide is adapted to generate the slide signal;

an indicator; and a device according to claim 1 mounted to the door frame or to the door blade, wherein the slide signal input terminal is connected to the door controller or to the slide to receive the slide signal generated by the door controller and the slide, respectively, the tilt angle signal output terminal is connected to the door controller to provide the tilt angle signal to the door controller, and the slide status output terminal is connected to the indicator, wherein the indicator is adapted to indicate, based on the slide status signal received from the slide status output terminal, when slide is not ready for use following deployment thereof.

13. An aircraft comprising a fuselage, in which an aperture is formed, and a door arrangement according to claim 12, the door frame of which is mounted in the aperture, wherein:

the predetermined axis is oriented perpendicularly with respect to a longitudinal direction of the fuselage; and wherein the aircraft specific data are specific to the aircraft and the door provided by the door arrangement.

* * * * *